United States Patent [19]

Spiller et al.

[11] 4,032,610

[45] June 28, 1977

[54] MANUFACTURE OF CONTOURED RECORDS

[75] Inventors: Basil Harry Royston Spiller; Alan Phillipson, both of London, England

[73] Assignee: Decca Limited, London, England

[22] Filed: Mar. 26, 1976

[21] Appl. No.: 670,842

Related U.S. Application Data

[60] Continuation of Ser. No. 520,166, Nov. 1, 1974, which is a division of Ser. No. 331,203, Feb. 9, 1973, Pat. No. 3,860,382.

[30] Foreign Application Priority Data

Feb. 23, 1972 United Kingdom ............... 8427/72
Oct. 17, 1972 United Kingdom ............ 47703/72

[52] U.S. Cl. ............................... 264/107; 264/153; 264/154; 264/284; 264/314
[51] Int. Cl.² ........................................ B29D 17/00
[58] Field of Search ............ 264/107, 284, 293, 314

[56] References Cited

UNITED STATES PATENTS

| | | | |
|---|---|---|---|
| 1,582,704 | 4/1926 | Sylvester | 425/810 X |
| 2,616,125 | 11/1952 | Colombo | 264/107 X |
| 2,998,622 | 9/1961 | Renoux | 425/DIG. 19 |
| 3,072,519 | 1/1963 | Salzman | 264/107 X |
| 3,157,723 | 11/1964 | Hochberg | 264/314 X |
| 3,614,811 | 10/1971 | Johnson | 264/314 X |

FOREIGN PATENTS OR APPLICATIONS

| | | |
|---|---|---|
| 708,342 | 5/1965 | United Kingdom |
| 144,840 | 9/1920 | United Kingdom |
| 920,227 | 3/1963 | United Kingdom |

*Primary Examiner*—Richard R. Kucia
*Attorney, Agent, or Firm*—Edward F. Connors

[57] ABSTRACT

A method of making disc records, particularly video discs from thermoplastic sheet material. In a press a thin flexible matrix is disposed between the sheet, which is backed by a resilient cushion, and a flexible diaphragm which constitutes a wall of a hydraulic pressure chamber.

6 Claims, 6 Drawing Figures

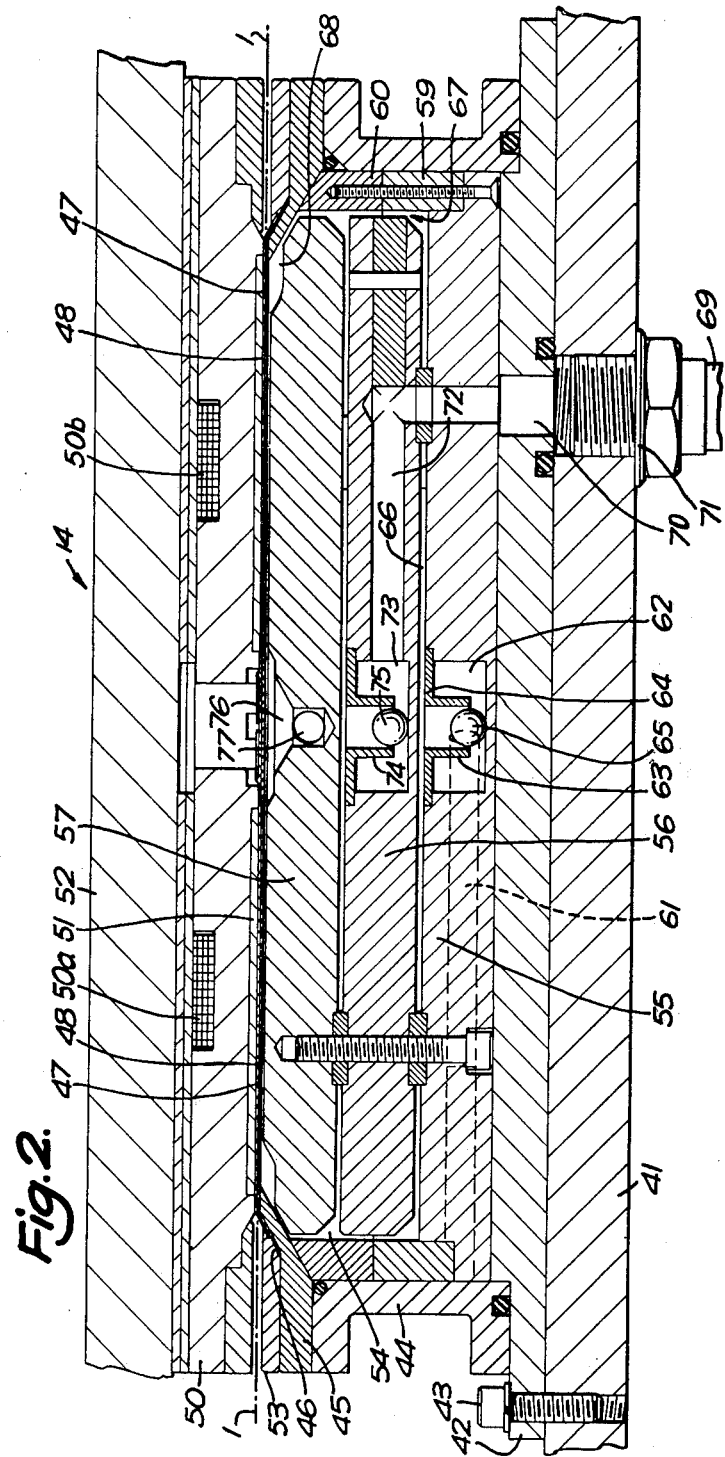

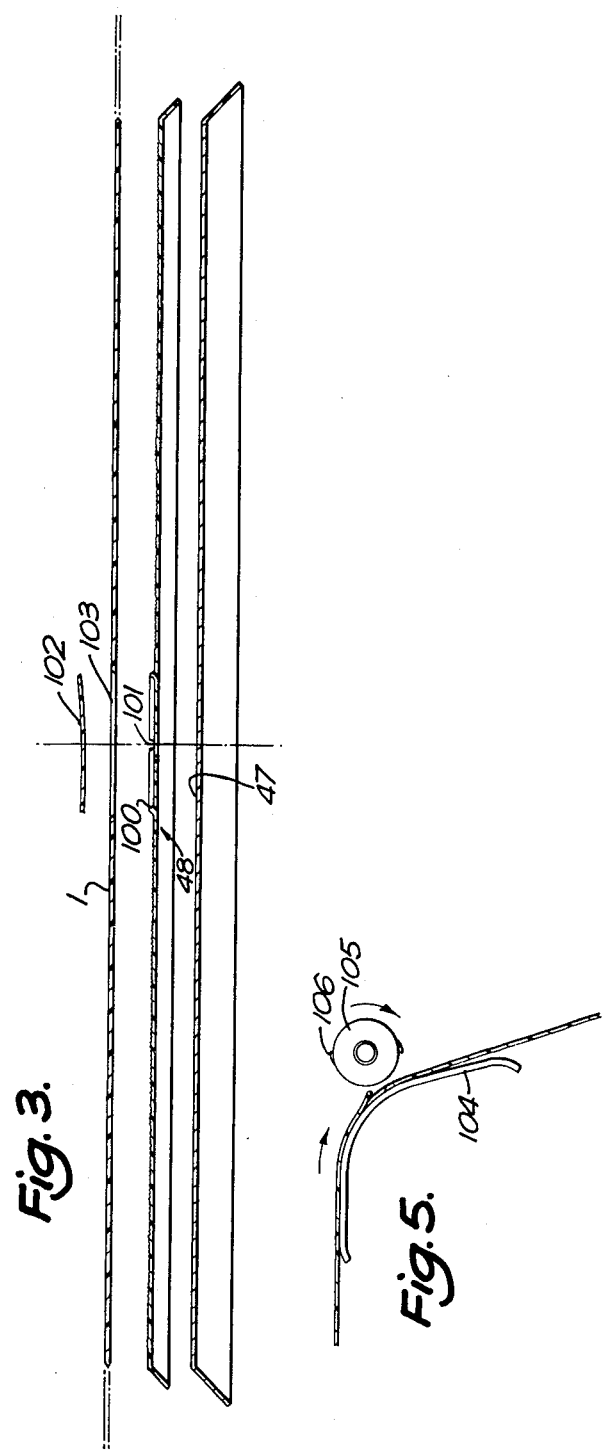

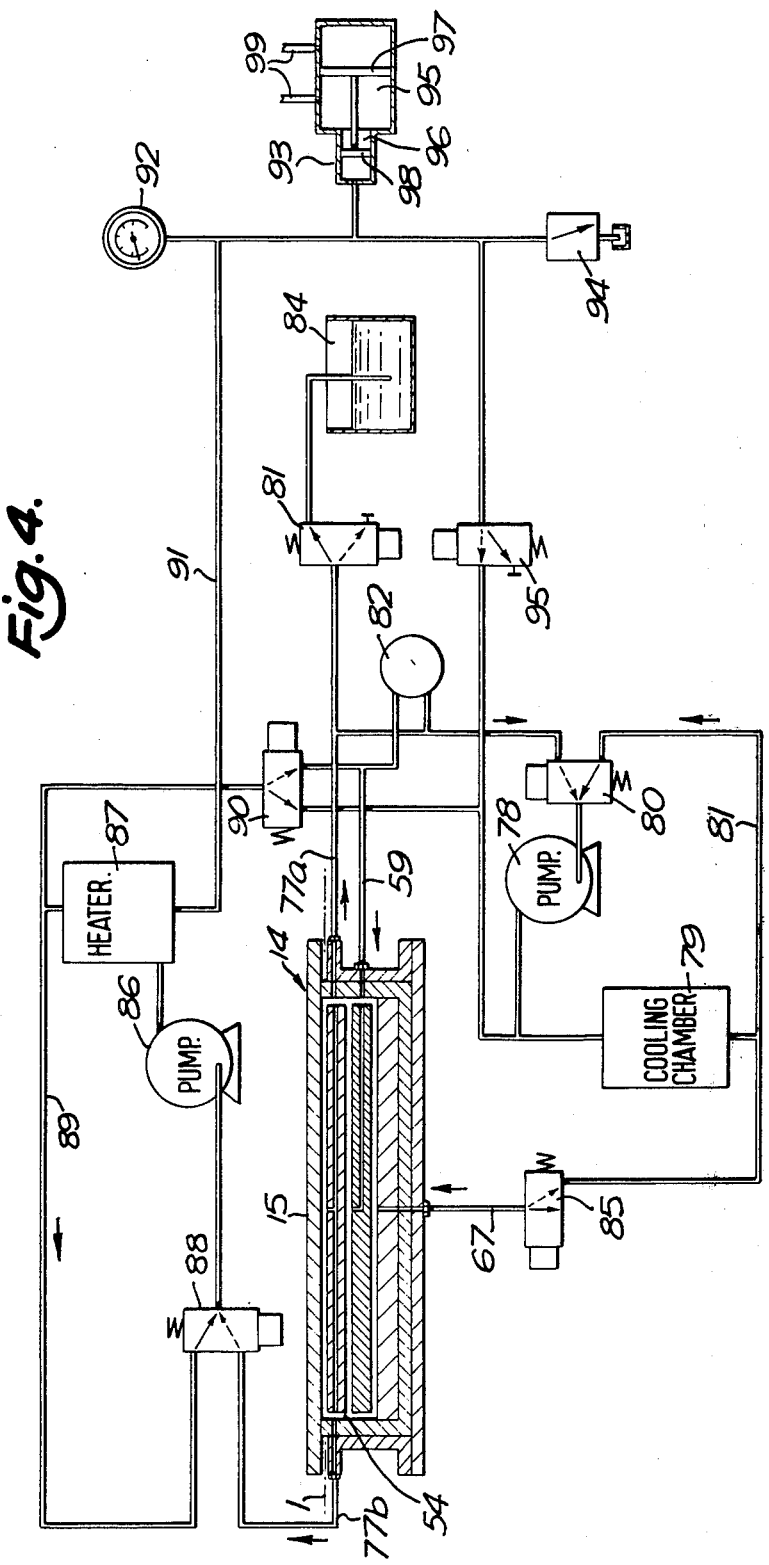

MANUFACTURE OF CONTOURED RECORDS

This is a continuation of application Ser. No. 520,166 filed Nov. 1, 1974, which is a divisional of Ser. No. 33,203, Feb. 9, 1973 now U.S. Pat. No. 3,860,382.

This invention relates to the manufacture of contoured records, in particular disc records.

The invention particularly although not exclusively relates to the manufacture of record discs of which each comprises a surface groove modulated in accord with high frequency signals such as television signals. In order to traverse such a record at high speed with respect to a pick-up that plays back the recorded signal by compressing the contours of the record, the record should normally consist of a thin flexible sheet. The invention is not, however, limited to the manufacture of video discs alone and may be exploited when making other records of which the physical characteristics are generally similar to those of video discs.

Gramophone records have been made by pressing of a biscuit of appropriate material or a preformed blank disc between rigid matrices which are forced towards each other mechanically or hydraulically. Such presses are necessarily both very precisely and robustly made in order that for example a matrix is centred precisely with respect to a disc on which sound tracks are embossed and that the required force, often in the region of 100 tons or more, can be applied to form the contours of the recording properly on the carrier. The present invention concerns the manufacture of accurately contoured records by the pressing of a matrix and a carrier together without necessitating great precision or robustness in the press itself.

The invention primarily consists in the manufacture of contoured records, comprising disposing a thin mouldable sheet facing a flexible contoured matrix and pressing the sheet and matrix together by the application of hydraulic pressure fluidly over the area of impression.

In general the location of the sheet with respect to the matrix is not critical and the pressure necessary for forming the record is less than in ordinary record-making presses.

The hydraulic pressure may be applied over the back of the matrix and the sheet may be resiliently supported against the said pressure. The sheet may be resiliently supported by a resilient cushion comprising for example a rubber body which may be provided with a coating of material to which the thin flexible sheet will not stick. There are various possible means by which the sheet could be supported, for example a backing plate or the application of equal and opposite pressure opposing the hydraulic pressure applied over the back of the matrix. The sheet may be backed by an inflatable or pneumatic cushion which is in the form of a dome of which the centre is at or near the centre of the region of impression. Preferably a flexible diaphragm is interposed between the back of the matrix and a body of liquid exerting the said hydraulic pressure. The matrix itself may accordingly comprise a thin circular or annular plate, which can be conveniently changed as desired. The flexible diaphragm may be rigidly supported along a perimeter extending around the area of impression and is preferably convex towards the matrix. These expedients are provided to help ensure that the central region of the matrix is pressed against the sheet first and any air between it and the sheet is squeezed out to the edge of the region of impression.

The sheet is preferably thermoplastic; it may for example be made of polyvinyl chloride. Accordingly the sheet may be heated during the impression by the transfer of heat from the liquid exerting the said pressure. The pressure may initialy be just sufficient to bring the sheet and matrix into contact provided that the diaphragm is then restrained against excessive movement, the pressure of the liquid may be greatly increased to bring the sheet and matrix into close contact.

In order to facilitate the rapid manufacture of a succession of records, the sheet may be elongate and may be traversed lengthwise after a pressing to bring a fresh region to face the matrix. A relatively simple traversing mechanism may be provided for this purpose.

In practice the region of impression is circular or annular; a disc embracing the region may be subsequently trepanned or otherwise removed from the sheet.

It would be possible to impress both broad sides of the sheet simultaneously using two opposed matrixes whilst still usng the basic techniques described herein.

The invention also provides apparatus for pressing contoured records onto the face of a thin mouldable sheet by means of flexible matrix; the apparatus preferably comprises a hydraulic pressure chamber of which a wall is formed by a flexible diaphragm supported at its perimeter, and a resilient cushion mounted for disposition facing the diaphragm.

The cushion preferably comprises a rubber body having a front coating to which the sheet material will not stick. Preferably the coating is polyester film such as 'Mylar' as used for magnetic tapes. The cushion may be supported on a hinged carrier. This can provide easy access to the diaphragm and the cushion for the insertion or change of a matrix.

Conveniently the apparatus comprises a mechanism for traversing a sheet of flexible material between the cushion and the diaphragm.

The said pressure chamber may be adapted to communicate with reservoirs of hot and cold liquid that can be pumped into the chamber to displace liquid already therein.

The diaphragm (preferably metallic) may be provided with a convolution of wrinkle near its perimeter in order to relieve stress in it when it transmits the fluid pressure to the matrix and also to relieve the stress due to thermal expansion of the diaphragm.

Reference will hereinafter be made to the accompanying drawings, in which:

FIG. 2 is a sectional view of a press forming part of the apparatus of FIG 1;

FIG. 3 illustrates a detail of the press of FIG. 2;

FIG. 4 is a schematic diagram of the press and its associated hydraulic circuit;

FIG. 5 illustrates a detail of the apparatus of FIG. 1; and

Figure 1:
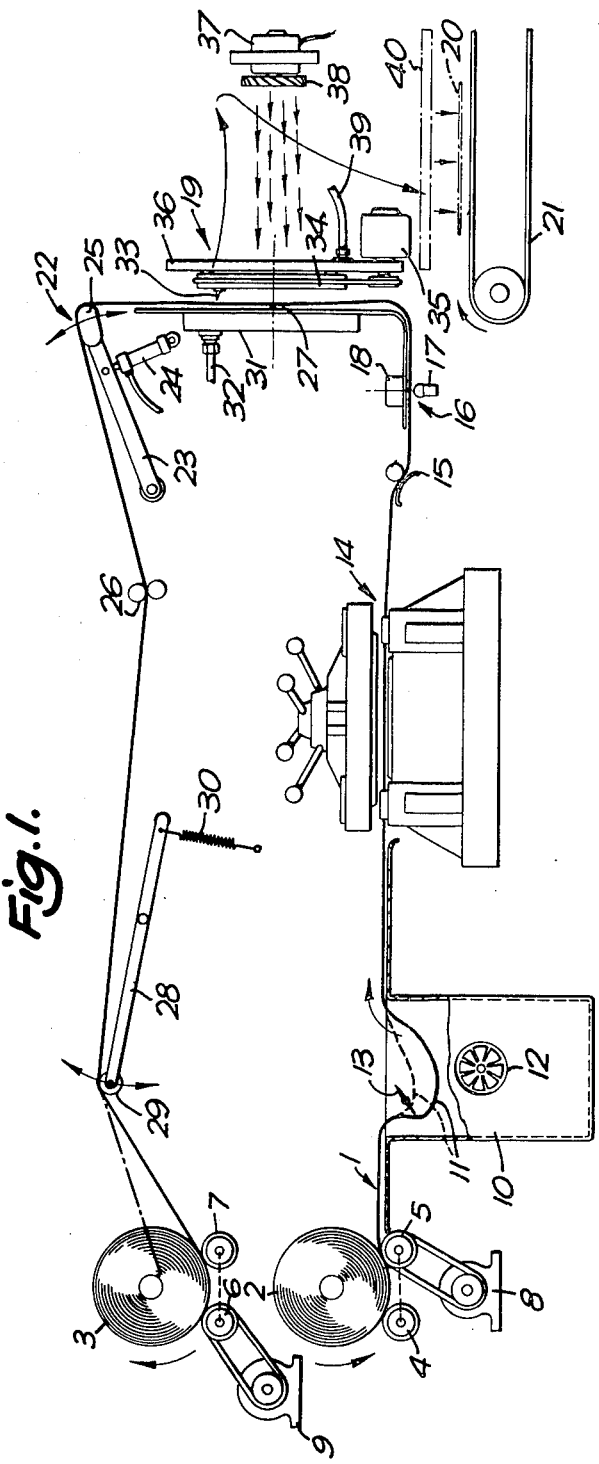
FIG. 1 is a general view of a record-making apparatus.

The apparatus shown generally in FIG. 1 of the drawings is arranged to impress contoured recordings at intervals along an elongate strip 1 of thermoplastic sheet material such as polyvinyl chloride. The strip 1 is supplied from a roll 2 and is taken up, after disc recordings have been cut from it, on a roll 3. The roll 2 is supported on a pair of rollers 4 and 5 whereas the roll 3 is supported on a pair of rollers 6 and 7. The rollers 4 and 5 are coupled together by means not shown and conjointly driven by a motor 8. The rollers 6 and 7 are coupled together by means not shown and are conjointly driven by a motor 9. Two rollers are used for driving each roll because the roll has a low coefficient of friction between its layers: moreover axial slip is inhibited.

From the supply roll 2 the strip 1 passes into a buffer bin 10 in which a loop 11 is normally formed. A fan 12 is provided for producing a local change in pressure required to form the loop in the bin. A paddle switch 13 is positioned to be engaged if the loop's length diminishes too much: the switch controls the driving of the roll 2 by the motor 8. When sufficient material has been dispensed a second switch (not shown) stops the motor 8. The weight of material is normally sufficient to maintain the loop, which is normally above or adjacent the fan.

When the strip on the downstream side of the bin is stationary a press 14 operates to impress by means of a matrix a circular area with a contoured groove recording on the strip 1 as hereinafter described, whereupon the strip is moved on so as to bring a fresh region of it into the ambit of the press. After leaving the press, the strip passes through a device 15 which extracts a partially severed disc from the centre of each circular region that has been impressed, so as to provide a centering hole for each disc record. The traversal of the strip is so arranged that a central hole of an impressed region is brought to rest approximately between a sensing arrangement 16 consisting of a lamp 17 and a photo cell 18. This controls the operation of a trepanner 19 which cuts out the circular impression immediately preceding the one whose hole is sensed by the arrangement 16. The trepanner is adapted to release a disc 20 on to a conveyor 21 which takes away each disc for packaging.

For controlling the passage of the strip 1 through the trepanner there is provided a mechanism 22 consisting of a pivoted arm 23 which is rotatably operable by a piston and cylinder arrangement 24 and carries at its free end a guide 25. Oscillation of the arm 23 about its pivot firstly draws the strip forwards and upwards through the trepanner 19 and then lowers it until the central hole of the circular region that is to be trepanned registers with a spigot 27 which is aligned along the central axis of the trepanner.

The trepanner 19 includes a thin circular chamber 31 of which the front surface, not shown in FIG. 1, is porous, and through which suction can be applied by means of a line 32. Facing the front surface of the chamber 31 is the trepanning mechanism itself which comprises a trepanning knife 33 carried on a carrier disc 34 which is peripherally mounted and is driven via a pulley belt by a motor 35. A support plate 36 is provided for mounting the motor 35 and the carrier 34. Behind the operative position of the trepanning mechanism is mounted a motor 37 which drives a fan 38. This provides a gentle blast of air to waft the strip 1 against the front surface of the chamber 31 before trepanning commences. The plate 36 and the components that is carries can be swung away from the operating position. By means of a line 39 suction can be applied to the central region of the carrier 34 so as to hold a trepanned disc against the carrier 34 until the carrier is swung down to a horizontal position, generally indicated by the reference 40, whereat the disc can be released. The carrier would normally remain in its horizontal position until the next recorded region is correctly positioned against the chamber 31.

Slack in the subsequent part of the strip 1, that is to say the part between the mechanism 22 and the take-up roll 3, can be taken up by an arm 28 which is pivoted at one end and carries at its outer end a guide in the form of a roller 29. This arm is preferably balanced, (for example, by a spring 30) for a particular tension in the strip. A cam on this arm can operate a switch for controlling the motor 9 that drives the take-up roll.

As far as the present invention is concerned the foregoing arrangements have been described only to indicate the relevance of the invention to a complete apparatus. Accordingly the intermittently operable advancing mechanism and the control thereof will not be further described in detail.

FIG. 2 is a vertical cross-section through the moulding press 14. The base of the press is formed by a base plate 41 on which is secured a circular plate 42 with an outwardly extending flange secured by bolts 43 to the base plate 41. Seated on the flange and fitting closely around it is a flanged annular wall 44 on which is mounted an annular inwardly extending rim 45 which is bevelled at its upper surface to support the periphery 46 of a thin metallic diaphragm 47 on which rests, during use, a matrix for impressing records.

FIG. 3 is an exploded view of the strip 1, the diaphragm 47 and the intermediate matrix 48 which carries on its upper surface a negative of the contoured groove that is to be impressed on the sheet 1 at intervals. The matrix 48 is a thin nickel disc and has a slight bevel round its rim so that it can sit centrally on the diaphragm. It is not however important that the centering of the matrix be exact. The diaphragm is flexible under the influence of hydraulic pressure. The strip 2 is traversed above the matrix 48 and A backing plate (FIG. 2) which carries an annular rubber pad 51 somewhat larger than the contoured region of the matrix and extending laterally to overlap the inward extension of the supporting rim 45. The rubber pad 51 has a relatively stiff polyester coating such as Mylar (Registered Trade Mark). The backing plate 50 is supported by a plate 52 which can be raised to allow the strip 1 to be tranversed between pressings. The support plate 52 may also be swung away from the diaphragm to provide access thereto for servicing or changing of the matrix.

The plate 50 is provided with electrical heating elements 50a, 50b.

The provision of a matt surface of relatively stiff material used as a coating for the pad 51 leads to the re-production of a matt surface on the back of the record discs.

The diaphragm is secured on the rim 45 by a bevelled annular ring 53. The diaphragm 47 forms the upper wall of a hydraulic pressure chamber 54. In this chamber 54 are three coaxially mounted thick insulating discs 55, 56 and 57. There is a narrow circular section space between adjacent pair of disc and between the uppermost disc and the diaphragm 47. Bolts 58, of which only one is shown, are provided for securing the discs in position; the lowest disc has peripheral rebate from which circular wall sections 59 and 60 extend to the rim 45. The three latter items are preferably made in the same poor conductor as the discs: the material used must withstand the temperature and pressures in the press. An asbestos-filled material may be used.

The discs 55 to 57 are constructed as manifolds by which hot and cold fluid, preferably oil, is spread evenly around the pressure chamber or collected therefrom, in the manner to be now described.

The disc 55 has an inlet passage 61 which extends horizontally that is to say through the body of the disc to a central circular recess 62 which opens at the top of the disc 55. The recess is partially closed by a flanged tube 63 which extends axially into the recess and is aligned with the central axis of the diaphragm 47. The flange 64 closes off the rest of the recess from the space between the discs 55 and 56. In the tube 63 is a light plastics ball 65 of diameter slightly less than the bore of the tube 63. The ball rests on the floor of the recess and the tube 63 extends to just below the equator of the ball.

When hydraulic fluid is allowed to flow into the recess along the passage 61, the ball 65, which is free to move along the tube between the ceiling formed by the lower surface of the disc 56 and the floor of the recess 62, spins and oscillates in the tube; the inlet fluid is distributed evenly in all directions radially outwardly throughout the space 66 between the discs 55 and 56. From that space the inlet fluid can flow upwardly through the narrow annular passage 67 between the peripheries of the disc 57 and 56 and the side wall of the chamber to the narrow, approximately circular space 68 between the top of the disc 57 and the diaphragm 47. The space 68 is narrow and extends over the area of the diaphragm.

An inlet pipe 69 is connected with an inlet bore 70 through the disc 55 to the disc 56; the pipe 69 and the bore 70 are connected by the screw fitting 71. The bore 70 communicates with an inlet passage 72 provided through the body of the disc 56, which has a central recess 73 similar to the recess 62. The recess 73 is partially closed by a flanged tube 74 of which the flange is flush with the upper surface of the disc. The tube 74 holds a ball 75 captive; the arrangement is similar to that described for the disc 55 and its ball 65. Accordingly fluid entering the pipe 69 is distributed outwardly in the space between the discs 56 and 57 in the manner described.

The uppermost disc 55 has a central inverted frustoconical recess 76 which leads to an outlet pipe 77 through which fluid that enters the space 68 can leave it.

The screw fitting 71 is shown as being of ordinary form: it would usually be desirable to provide insulation of the oil from the metal parts through which it must pass.

FIG. 4 illustrates schematically the hydraulic circuit by means of which oil is pumped around and through the press 14. It is convenient to describe first the preferred method of pressing by means of the press that has been described.

A pressing operation can commence when a blank portion of the strip 1 is in position between a matrix on the diaphragm 47 and the backing plate 50. The backing plate is lowered to a position in which it can maintain the strip 1 against the force of hydraulic pressure applied fluidly and evenly over the back of the diaphragm. Initially relatively cool oil is contained in the pressure chamber formed by the spaces between the discs 55 to 57 and the walls, including the back of the diaphragm, that contain them. The relatively cool fluid is displaced by hotter fluid, whose heat is transmitted by the diaphragm to the matrix and strip above it, and the pressure in the fluid in the pressure chamber is increased so that the combination of increases in temperature and pressure moulds the strip in accordance with the contours of the upper surface of the thin matrix. Subsequently, cooler fluid displaces the hotter fluid. The backing plate must be raised slightly to allow the strip 1 to move between successive pressings.

FIG. 4 illustrates the press 14 and the strip 1 which passes between underneath the backing plate 50 and the pressure chamber 54. The Figure also illustrates the inlet pipe 61, the inlet pipe 69 and the outlet pipe 77 which has two branches, 77a and 77b, extending diametrically away from each other. The connections to the press are shown schematically: the connections are preferably made to the underside of the press.

A circuit for cold oil is provided by a pump 78, a cooling chamber 79, a pneumatically operated valve 80, and a return pipe 81. To this circuit are connected a one input of a differential pressure gauge 82 and a relief circuit comprising a solenoid operated valve 83 which when operated allows fluid to flow to an expansion chamber 84. Operation of the valve 80 can divert the cold circuit from the cold tank to the inlet pipe 61 via a further pneumatically operable valve 85 between the tank and the pipe 61.

A circuit for hot fluid is provided by a pump 86, a hot tank 87, a pneumatically operated valve 88 and a return pipe 89. Operation of the valve 88 and a further, similar valve 90 between the tank 87 and the pipe 69 will divert hot fluid into the press. From the heater 87 extends a line 91 coupled to a pressure gauge 92, an intensifier 93, a relief valve 94 and, through a pneumatically operated valve 95, to the cooling chamber 79, to which one possible outlet of the valve 90 is also connected. The other outlet of the valve 90 is connected to the pipe 69 and the differential pressure gauge, which indicates the pressure drop in the press due to the flow of fluid.

Oil is circulated through the press 14 or is recirculated through the storage tanks as directed by the values 80, 85, 88 and 90. The expansion chamber 84 is fitted so that during a warming-up period the increased volume of oil is accommodated. The valve 83 when closed, cuts off the expansion chamber from the rest of the circuit. The intensifier comprises two chambers 96a and 96 containing one each of two mechanically linked pistons 97 and 98. The chamber containing the larger piston 97 has inlets 99 for air. When air at for example 70 pounds per square inch, enters the chamber 96a the resultant force on the piston 97 is opposed by the smaller diameter piston 98 and equilibrium can only be reached when the pressure on the small piston becomes high enough (typically 300 p.s.i.) to give an equal opposing force. The valve 90 ensures that during the cooling part of a moulding cycle any oil expanding out of the hot circuit (due to electrical heating of the oil) does not enter the cell and mix with the cooling oil circulating through the cell. The valve 95 is normally closed and is fitted to block the flow of hot oil in the intensifier pipe 91 during the warm-up period, so preventing very hot oil from reaching the intensifier. The differential pressure gauge is fitted to give an indication of flow rate through the cell on both hot and cold circuits. The relief valve 94 is set at a pressure 10 percent greater than the intensified pressure used and acts as a safety valve. The valve 85 prevents cold oil from being pushed through the cell into the hot circuit during intensification.

The normal operation during a moulding cycle is as follows. Closing of the cell onto the sheet 1 operates a microswitch (not shown) which initiates the energising of the valve 95 and the intensifier. The valve 85 is closed. The valves 88 and 90 are then operated, causing hot oil to flow through the press. At the end of a timed period these valves are released and hot fluid is cut off, the flow of cold fluid through the press is started by operating valves 80 and 85. After a further timed period the valves 80, 83 and 85 are released, the intensifier is deactivated and the press can be opened. The valve 95 is continuously open during automatic cycling of the press.

The temperature and pressures employed in the press may vary widely. The temperature in the cold circuit may typically be approximately atmospheric temperature or below whereas the temperature in the hot circuit should be at least 40° C above the softening point of the sheet material if polyvinyl chloride is used.

A differential pressure gauge is connected between the outlet pipe 77a and the inlet pipe 69 for monitoring the drop across the cell. Typically the maximum pressure exerted by the fluid over the whole of the back of the diaphragm is of the order of 10 metric tons.

It will be apparent that the diaphragm is held rigidly at its edges so that under normal circumstances the central region of it is brought into intimate pressing contact with the film 1. The region of intimate contact spreads out radially thus squeezing any air bubbles that may exist between the diaphragm and the film radially outwardly.

For the playback of records containing a contoured groove modulated in accord with video signals it is essential that the central hole that will engage the spindle of a driving disc or other means be positioned with great precision relatively to the groove. FIG. 3 shows that the central region of the matrix 48 is provided with an annular ridge 100; this can be formed at the same time as the contours of the front surface of the matrix are formed and one may readily ensure by optical or other techniques, that the ridge is truly circular and that the matrix of the contoured groove is properly centered on it. The ridge need not be as high as the strip 1 is thick. When the matrix 48 and the strip 1 are brought into close contact a circular disc 102 is at least partially moulded out of the strip 1. The disc 102 need not be completely moulded out; in particular the ridge 100 may have at least one notch 101, and preferably two such notches, interrupting it so that the disc 102 is held within the main body of the strip by at least two necks of material until it is prised out to leave, as shown, a circular hole 103. Reference can now be made again to FIG. 1 and also to FIG. 5 which illustrate that as the strip 1 is traversed away from the press it passes over a guide 104 and bends round this guide so that the disc which is only held by two lateral necks has a leading edge which curls slightly away from the rest of the strip. This leading edge can be engaged by a small roller 105 containing at least one and preferably two small short knife blades 106 (positioned near the path of the centre of the disc 102) by means of which the disc 102 is prised away from the main body of the strip 1. This leaves a properly formed central hole which as already explained with reference to FIG. 1 can be sensed by the sensing arrangement 16 to assist in the proper positioning of a preceding moulded region with respect to the trepanning device 19. Care must be taken to avoid contact between the blades and the countoured moulding.

An alternative to the electroforming of the annular ridge is the provision of a premachined auxiliary centre for the matrix: a central depression in the diaphragm would be made deep enough to accomodate such a centre. The matrix would be made with a central hole into which the preformed centre, carrying a ridge for forming the central hole in the disc.

Figure 6:
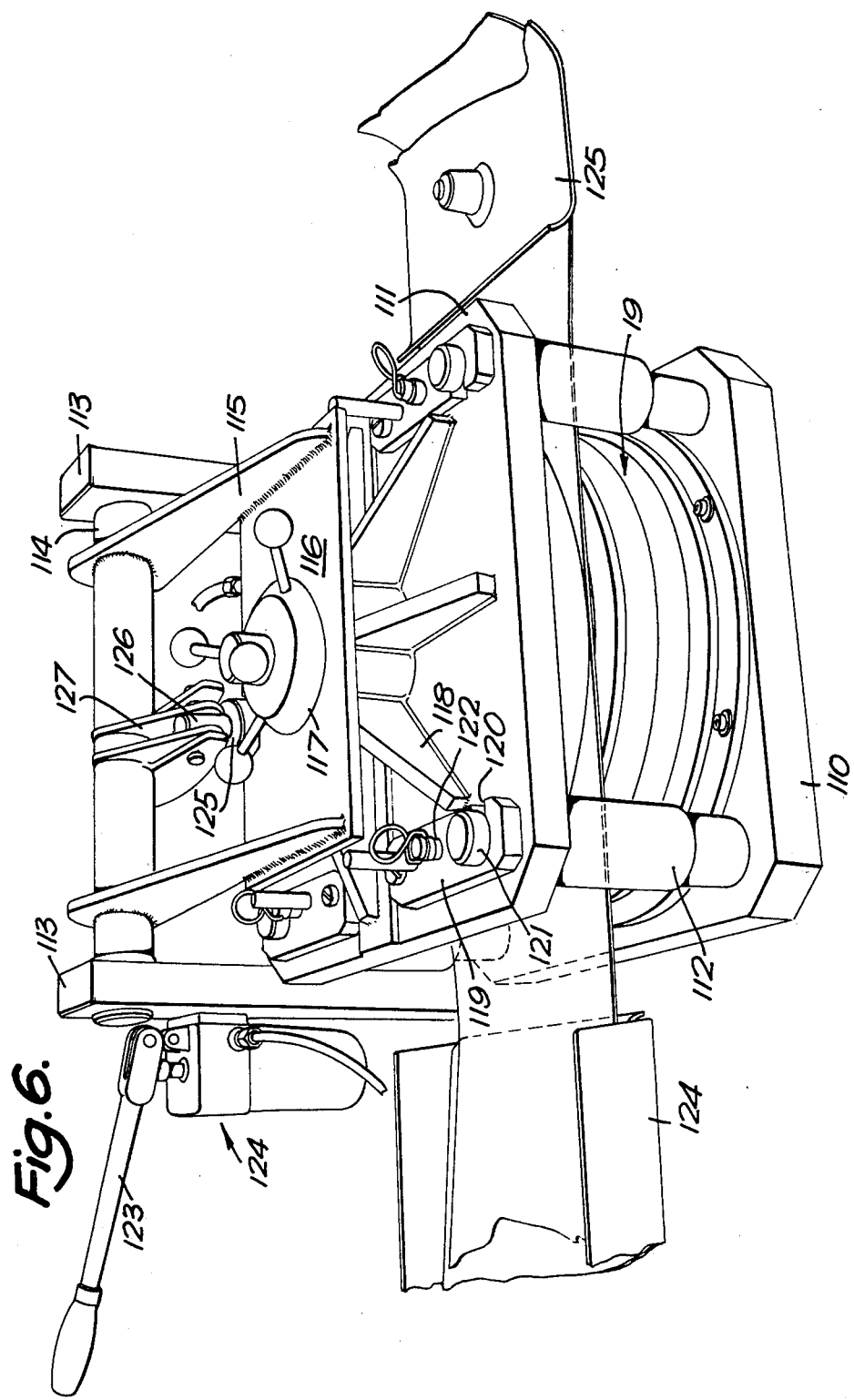
FIG. 6 is a perspective view of the external parts of the press.

FIG. 6 is an exterior view of the press. The press 19 has a base plate 110 and a top plate 111 to which the backing plate 50 is secured. The top plate 111 is movable towards and away from the bottom plate 110 by four press tie bars 112, which are drawn through the plate 110 by a hydraulic assembly (not shown) below the plate 110, to bring the top plate towards the base plate or, if the bars are uncoupled from the top plate, to withdraw the bars therefrom.

FIG. 6 also illustrates an arrangement by which the backing plate can be removed for servicing. Two spaced apart vertical columns 113 at the side of the press support a horizontal shaft 114 carrying trunnions 115 supporting a plate 116 which mounts a turret fitting 117. This can screw into an embossment 118 on the top plate 111. The top plate carries four flat pivoted plates 119 each of which has a slot 120 which can engage a head 121 of one of the bars 112. In the engaged position each plate 119 is located by a respective pin 122 which extends through the plate 119 to the plate 111. When it is desired to raise the plate 111 and also the backing plate 50 for servicing, the retaining pins 122 are removed from the plate 119. The plate 116 is lowered and the turret 117 is screwed down to engage the embossment 118. The handle 123 of a manually operable hydraulic pump 124 can be vertically oscillated to provide driving pressure to a cylinder 125 to raise a piston rod 126 which is connected by a link 127 to the shaft 114. Accordingly vertical movement of the rod 126 rotates the shaft 114 and raises the plates 116 and 111 and the backing plate 50 away from the base part of the press. The prior withdrawal of the bars 112 down from the top plate 111 is necessary.

We claim:
1. A method of making contoured records comprising the steps of:
   disposing a sheet of thin thermoplastics material between a support and one side of a thin, flexible, heat conductive, contoured matrix;
   heating the region of the sheet adjacent the matrix uniformly by distributing relatively hot hydraulic fluid under pressure evenly to the periphery of a narrow circular pressure chamber of which one broad wall is cnstituted by a thin, flexible, heat conductive diaphragm disposed adjacent the other side of the matrix, and providing a radial even flow of the fluid towards an outlet provided in the center of the chamber;
   impressing the contours of the matrix on said sheet by increasing the pressure of said even radial flow of fluid through the chamber whereby said region of the sheet is pressed against the support; and
   cooling the impressed region of the sheet by providing a radial even flow of relatively cold hydraulic fluid through the chamber from the periphery to the central outlet thereof.

2. A method as set forth in claim 1, further comprising resiliently supporting said sheet against said matrix.

3. A method as set forth in claim 1, further comprising the steps of:
- directing said hydraulic fluid to a central recess in a second chamber coaxial with said first mentioned chamber;
- distributing fluid evenly and radially outwardly in said second chamber; and,
- directing fluid from the second chamber through an annular passage to the periphery of the first mentioned chamber for said heating or cooling steps as aforesaid.

4. A method as set forth in claim 1, further comprising the steps of:
- intermittently moving said sheet lengthwise past said matrix;
- impressing said sheet alternately with lengthwise movements of said sheet; and,
- severing impressed regions of the sheet from the remainder of the sheet.

5. A method as set forth in claim 4, in which said severing step comprises trepanning said regions.

6. A method as set forth in claim 4, further comprising forming a central hole in each region of impression of said sheet.

* * * * *